(12) United States Patent

Otani et al.

(10) Patent No.: US 9,138,775 B2
(45) Date of Patent: Sep. 22, 2015

(54) METHOD FOR PREPARING ARTICLE HAVING UNEVEN MICROSTRUCTURE ON SURFACE THEREOF

(75) Inventors: Go Otani, Otake (JP); Yusuke Nakai, Otake (JP); Satoru Ozawa, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/990,183

(22) PCT Filed: May 25, 2012

(86) PCT No.: PCT/JP2012/063498
§ 371 (c)(1),
(2), (4) Date: May 29, 2013

(87) PCT Pub. No.: WO2012/161315
PCT Pub. Date: Nov. 29, 2012

(65) Prior Publication Data
US 2014/0077418 A1    Mar. 20, 2014

(30) Foreign Application Priority Data

May 26, 2011  (JP) .................................. 2011-118087
May 26, 2011  (JP) .................................. 2011-118088

(51) Int. Cl.
*B05D 5/02*      (2006.01)
*B29C 59/04*    (2006.01)
(Continued)

(52) U.S. Cl.
CPC . *B05D 5/02* (2013.01); *B29C 33/60* (2013.01); *B29C 39/148* (2013.01);
(Continued)

(58) Field of Classification Search
USPC ................................................ 264/130, 213
See application file for complete search history.

(56) References Cited

U.S. PATENT DOCUMENTS 4,308,063 A * 12/1981 Horiuchi et al. ............ 106/38.22
6,491,979 B1 * 12/2002 Yamaguchi et al. ....... 427/385.5
(Continued)

FOREIGN PATENT DOCUMENTS

EP    2 210 970      7/2010
JP    2005-156695   6/2005
(Continued)

OTHER PUBLICATIONS

Korean Office Action dated Aug. 27, 2013 for Korean Patent Application No. 10-2013-7013918.
(Continued)

*Primary Examiner* — Yogendra Gupta
*Assistant Examiner* — Kimberly A Stewart
(74) *Attorney, Agent, or Firm* — Morgan, Lewis & Bockius LLP

(57) ABSTRACT

A method for preparing an article having an uneven microstructure on a surface thereof, including coating a surface of a mold having an uneven microstructure formed from an anodized alumina oxide on a surface with a release treatment solution including a mold release agent that includes one or more kinds of phosphoric ester compound and the pH of the aqueous solution when extracted with 50 mL of water with respect to 1 g of the mold release agent is 3.0 or more; and interposing an active energy ray curable resin composition including a polymerizable compound, a polymerization initiator, and an internal release agent between the mold and the substrate, and curing the active energy ray curable resin composition by the irradiation with active energy rays to form a cured resin layer having the uneven microstructure transferred on a surface of the substrate.

6 Claims, 2 Drawing Sheets

(51) Int. Cl.
- B29C 33/60 (2006.01)
- B29C 39/14 (2006.01)
- G02B 1/118 (2015.01)
- B29C 35/08 (2006.01)
- B29C 59/02 (2006.01)
- B29C 33/42 (2006.01)

(52) U.S. Cl.
CPC ............. B29C 59/046 (2013.01); G02B 1/118 (2013.01); *B29C 33/424* (2013.01); *B29C 2035/0827* (2013.01); *B29C 2059/023* (2013.01)

(56) References Cited

U.S. PATENT DOCUMENTS

| | | | |
|---|---|---|---|
| 2004/0059013 A1 | 3/2004 | Tanabe et al. | |
| 2010/0243458 A1* | 9/2010 | Kojima et al. | 205/50 |
| 2012/0225996 A1* | 9/2012 | Kawato et al. | 524/590 |

FOREIGN PATENT DOCUMENTS

| | | |
|---|---|---|
| JP | 2007-326367 | 12/2007 |
| JP | 2009-241351 A | 10/2009 |
| JP | 2010-005841 | 1/2010 |
| JP | 2011-025683 | 2/2011 |
| WO | 2009/107946 A2 | 9/2009 |
| WO | 2010/100902 | 9/2010 |
| WO | 2011/016337 A1 | 2/2011 |
| WO | 2011/155499 | 12/2011 |

OTHER PUBLICATIONS

International Search Report for PCT/JP2012/063498 dated Aug. 28, 2012 with English Translation.
European Search Report for 12789003.6 dated Feb. 6, 2014.
Chinese Office Action issued in Chinese Patent Application No. 201280003971.0 on Dec. 25, 2013.
"Industrial Surfactants Innovation", Dai-ichi Kogyo Seiyaku Co., Ltd., http://www.dks-web.co.jp, 27 pages.
Production Catalog of Nippon Nyukazai Co., Ltd., Jun. 2008, 53 pages.

* cited by examiner

METHOD FOR PREPARING ARTICLE HAVING UNEVEN MICROSTRUCTURE ON SURFACE THEREOF

TECHNICAL FIELD

The present invention relates to a method for preparing an article having an uneven microstructure on a surface thereof.

Priority is claimed on Japan Patent Application No. 2011-118087 filed May 26, 2011 and Japan Patent Application No. 2011-118088 filed May 26, 2011, the contents of which are incorporated herein by reference.

BACKGROUND ART

In recent years, it has become known that articles having an uneven microstructure on a surface thereof with a period not more than the wavelength of visible light exhibit an antireflection effect, a lotus effect, and the like. Particularly, it is known that an uneven structure that is constructed with approximately convex cone structures, a so-called moth-eye-structure, becomes effective antireflection means since the refractive indices keep increasing continuously from the refractive index of the air to the refractive index of the article.

As a method for forming an uneven microstructure on a surface of an article, the following method arouses interest: an active energy ray curable resin composition is interposed between a mold having an uneven microstructure on a surface thereof and a substrate and cured by the irradiation with active energy rays to form a cured resin layer having the uneven microstructure transferred thereto on a surface of the substrate.

Furthermore, as the mold, a mold having an anodized alumina oxide with plural pores on a surface of an aluminum-based substrate attracts interest, from the viewpoint that the mold can be simply prepared (Patent Literature 1).

However, the mold has a problem that the contact interface between the mold and the active energy ray curable resin composition increases drastically for the following reasons (i) to (iii), and therefore, it is difficult to release the mold from the cured resin layer.

(i) The average interval of the pores in the anodized alumina oxide is from about 100 nm to 400 nm, and the distance between the pores in a portion having pores closest to each other is from a few nanometers to a few tens of nanometers. That is, the structure is very fine.

(ii) As described in Patent Literature 1, in a case where the pores are formed by performing anodization and etching repeatedly, the smoothness of the wall surface of the pores may decrease, and thus, the wall surface of the pores may become coarse to some degree in some cases.

(iii) In a case where it is intended to obtain a function such as a sufficient antireflective effect, it is necessary to adjust the aspect ratio of a pore to a relatively large value.

Examples of the mold for improving the releasability of the mold from the cured resin layer include a method in which the surface on the side where the uneven microstructure of the mold is formed is treated with a release agent (mold release agent) that reacts with the surface of the mold (Patent Literature 2).

However, the method has the following problems (iv) to (viii).

(iv) In a case where the uneven microstructure of the mold is transferred repeatedly, the mold release agent is detached from the surface of the mold, whereby the releasability is gradually reduced. If the releasability is reduced, the productivity of the article is also reduced, and a part of the transferred uneven microstructure is damaged, and the transfer accuracy is thus also reduced.

(v) There are some cases where the mold release agent detached from the surface of the mold moves to the surface of the article, which is thus fouled, and therefore, as the number of times of transfer increase from an initial time of the transfer, a remarkable change in the characteristics of the surface of the article is actualized. Further, in a situation where the mold release agent is detached, the height of the convex portions of the transferred uneven microstructure is gradually changed, and consequently, the surface physical properties as well as the optical characteristics of the article are also changed. As a result, after the initiation of the preparation, an article having an uneven microstructure on a surface thereof obtained during the change in the characteristics of the surface and the optical characteristics cannot be shipped as a product, resulting in a waste of the raw materials and the source materials consumed until the surface of the article characteristics and the optical characteristics are stabilized.

(vi) In a case where the fluorine-containing silane compound and the fluorine-based solvent, each described in Patent Literature 2, are used to subject a mold to a release treatment, the cost required for the release treatment with an increase in the area of the mold poses a problem from the viewpoint that the fluorine-containing silane compound and the fluorine-based solvent are expensive. In particular, it is expected that such a problem becomes apparent in a case where the mold has a roll shape and the whole roll having a large size is immersed in a treatment liquid.

(vii) The fluorine-containing silane compound has a problem in a stable and uniform treatment of the surface of the mold since aggregates due to the reaction between the silanol groups in a case of absorbing moisture are generated. As a result, there are some cases where when the liquid accumulation of the release treatment liquid is generated when the release treatment is carried out, the aggregates of the fluorine-containing silane compound remain in the portions with the liquid accumulation, which become the defects of the mold.

(viii) In a case where unwanted residues and the like remaining on the monomolecular film of the fluorine-containing silane compound formed on the surface of the mold are rinsed with a fluorine-based solvent, the number and the cost of the steps further increase.

CITATION LIST

Patent Literature

[Patent Literature 1] Japanese Unexamined Patent Application, First Publication, No. 2005-156695
[Patent Literature 2] Japanese Unexamined Patent Application, First Publication, No. 2007-326367

SUMMARY OF INVENTION

Technical Problem

The present invention provides a method for stably preparing an article having an uneven microstructure on a surface thereof with high productivity, in which when an active energy ray curable resin composition which is cured when interposed between a mold and a substrate to form a cured resin layer having the uneven microstructure of the mold transferred thereto on a surface of the substrate, the releasability of the mold from the cured resin layer and the shape and surface characteristics of the transferred uneven microstructure can be maintained even when the uneven microstructure of the mold is transferred repeatedly.

Solution to Problem

A first aspect of the present invention is a method for preparing an article having an uneven microstructure on a surface thereof, as follows.

[1] A method for preparing an article having an uneven microstructure on a surface thereof, including the following steps (I) and (II):

(I) a step of coating a surface of a mold having an uneven microstructure formed from an anodized alumina oxide on a surface thereof with a release treatment solution including a mold release agent, in which the mold release agent includes one or more kinds of phosphoric ester compound and the pH of the aqueous solution when extracted with 50 mL of water with respect to 1 g of the mold release agent is 3.0 or more; and (II) a step of, after the step (I), interposing an active energy ray curable resin composition including a polymerizable compound, a polymerization initiator, and an internal release agent between the mold and the substrate, and curing the active energy ray curable resin composition by the irradiation with active energy rays to form a cured resin layer having the uneven microstructure transferred thereto on a surface of the substrate, thereby obtaining an article having an uneven microstructure on a surface thereof.

[2] The method for preparing an article having an uneven microstructure on a surface thereof as described in [1], in which the mold release agent is a (poly)oxyalkylene alkyl phosphoric acid compound.

[3] The method for preparing an article having an uneven microstructure on a surface thereof as described in [1] or [2], in which the release treatment solution is a 0.01 to 2.0% by weight aqueous solution of the mold release agent.

[4] The method for preparing an article having an uneven microstructure on a surface thereof as described in any one of [1] to [3], in which the active energy ray curable resin composition includes a (poly)oxyalkylene alkyl phosphoric acid compound as the internal release agent.

[5] The method for preparing an article having an uneven microstructure on a surface thereof as described in any one of [1] to [4], in which the pH of the aqueous solution when extracted with 50 mL of water with respect to 1 g of the internal release agent is 3.0 or more.

[6] The method for preparing an article having an uneven microstructure on a surface thereof as described in any one of [1] to [5], in which the mold release agent and the internal release agent are the same as each other.

[7] The method for preparing an article having an uneven microstructure on a surface thereof as described in any one of [1] to [6], in which the difference in the SP values between the mold release agent and the internal release agent is 2.0 or less.

A second aspect of the present invention is a method for preparing an article having an uneven microstructure on a surface thereof, as follows.

[1] A method for preparing an article having an uneven microstructure on a surface thereof, including the following steps (I') and (II'):

(I') a step of coating a surface of a mold having an uneven microstructure formed from an anodized alumina oxide on a surface thereof with a (poly)oxyalkylene alkyl phosphoric acid compound; and (II') a step of, after the step (I'), interposing an active energy ray curable resin composition including a polymerizable compound, a polymerization initiator, and an internal release agent between the mold and the substrate, and curing the active energy ray curable resin composition by the irradiation with active energy rays to form a cured resin layer having the uneven microstructure transferred thereto on a surface of the substrate, thereby obtaining an article having an uneven microstructure on a surface thereof.

[2] The method for preparing an article having an uneven microstructure on a surface thereof as described in [1], in which the active energy ray curable resin composition includes a (poly)oxyalkylene alkyl phosphoric acid compound as the internal release agent.

[3] The method for preparing an article having an uneven microstructure on a surface thereof as described in [1] or [2], in which the step (I') has the following steps (I'-1) and (I'-2):

(I'-1) a step of dissolving a (poly)oxyalkylene alkyl phosphoric acid compound in a solvent to prepare a release treatment solution; and (I'-2) a step of coating the surface of the mold with the release treatment solution, and drying the release treatment solution.

A third aspect of the present invention is a method for preparing an article having an uneven microstructure on a surface thereof, as follows.

[1] A method for preparing an article having an uneven microstructure on a surface thereof, including the following steps (I") and (II"):

(I") a step of treating a surface of a mold having an uneven microstructure formed from an anodized alumina oxide on a surface thereof with a mold release agent; and (II") a step of, after the step (I"), interposing an active energy ray curable resin composition including a polymerizable compound, a polymerization initiator and an internal release agent which is the same as the mold release agent between the mold and the substrate, and curing the active energy ray curable resin composition by the irradiation with active energy rays to form a cured resin layer having the uneven microstructure transferred thereto on a surface of the substrate, thereby obtaining an article having an uneven microstructure on a surface thereof.

[2] The method for preparing an article having an uneven microstructure on a surface thereof as described in [1], in which the mold release agent and the internal release agent have a (poly)oxyalkylene alkyl phosphoric acid compound as a main component.

[3] The method for preparing an article having an uneven microstructure on a surface thereof as described in [1] or [2], in which the step (I") has the following steps (I"-1) to (I"-2):

(I"-1) a step of dissolving a mold release agent in a solvent to prepare a release treatment solution; and (I"-2) a step of coating the surface of the mold with the release treatment solution, and drying the release treatment solution.

Advantageous Effects of Invention

According to the method for preparing an article having an uneven microstructure on a surface thereof of the present invention, when an active energy ray curable resin composition is cured when interposed between a mold and a substrate to form a cured resin layer having the uneven microstructure of the mold transferred thereto on a surface of the substrate, the releasability of the mold from the cured resin layer and the shape and surface characteristics of the transferred uneven microstructure can be maintained even when the uneven microstructure of the mold is transferred repeatedly, and therefore, an article having an uneven microstructure on a surface thereof can be stably prepared with high productivity.

DESCRIPTION OF EMBODIMENTS

Figure 1:
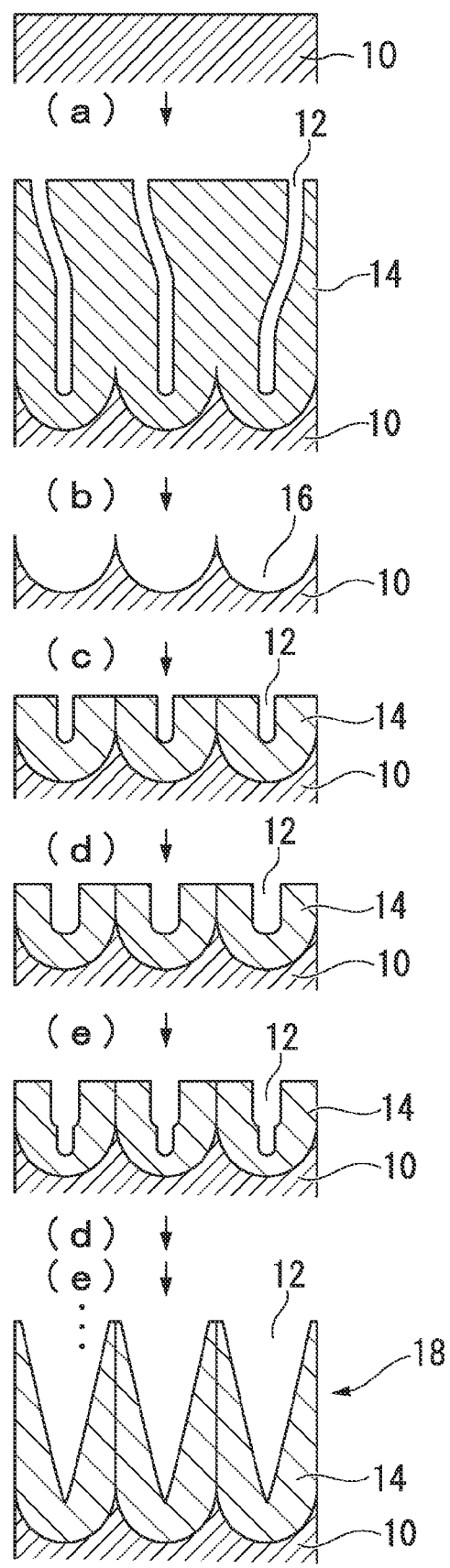
FIG. 1 is a cross-sectional view showing a step of preparing a mold having an anodized alumina oxide on a surface thereof.

In the present specification, the uneven microstructure means a structure having an average interval (period) of the convex portions or concave portions of not more than the wavelength of visible light, that is, 400 nm or less. Further, the active energy rays mean visible rays, ultraviolet rays, an electron beam, plasma, heat rays (infrared rays, etc.), or the like. Further, the (poly)oxyalkylene alkyl phosphoric acid compound means an oxyalkylene alkyl phosphoric acid compound having one oxyalkylene group or a polyoxyalkylene alkyl phosphoric acid compound having two or more oxyalkylene groups. Further, the (meth)acrylate means acrylate or methacrylate.

<Method for Preparing Article>

The method for preparing an article having an uneven microstructure on a surface thereof in the first aspect of the present invention is a method including the following steps (I) and (II):

(I) a step of coating a surface of a mold having an uneven microstructure formed from an anodized alumina oxide on a surface thereof with a release treatment solution including a mold release agent, in which the mold release agent includes one or more kind of phosphoric ester compound and the pH of the aqueous solution when extracted with 50 mL of water with respect to 1 g of the mold release agent is 3.0 or more; and (II) a step of, after the step (I), interposing an active energy ray curable resin composition including a polymerizable compound, a polymerization initiator and an internal release agent between the mold and the substrate, and curing the active energy ray curable resin composition by the irradiation with active energy rays to form a cured resin layer having the uneven microstructure transferred thereto on a surface of the substrate, thereby obtaining an article having an uneven microstructure on a surface thereof.

The method for preparing an article having an uneven microstructure on a surface thereof in the second aspect of the present invention is a method including the following steps (I') and (II'):

(I') a step of coating a surface of a mold having an uneven microstructure formed from an anodized alumina oxide on a surface thereof with a (poly)oxyalkylene alkyl phosphoric acid compound; and (II') a step of, after the step (I'), interposing an active energy ray curable resin composition including a polymerizable compound, a polymerization initiator and an internal release agent between the mold and the substrate, and curing the active energy ray curable resin composition by the irradiation with active energy rays to form a cured resin layer having the uneven microstructure transferred thereto on a surface of the substrate, thereby obtaining an article having an uneven microstructure on a surface thereof.

The method for preparing an article having an uneven microstructure on a surface thereof in the third aspect of the present invention is a method including the following steps (I") and (II"):

(I") a step of treating a surface of a mold having an uneven microstructure formed from an anodized alumina oxide on a surface thereof with a mold release agent; and (II") a step of, after the step (I"), interposing an active energy ray curable resin composition including a polymerizable compound, a polymerization initiator and an internal release agent which is the same as the mold release agent between the mold and the substrate, and curing the active energy ray curable resin composition by the irradiation with active energy rays to form a cured resin layer having the uneven microstructure transferred thereto on a surface of the substrate, thereby obtaining an article having an uneven microstructure on a surface thereof.

[Steps (I), (I'), and (I")]

In the step (I) in the first aspect of the present invention, the surface on the side where the uneven microstructure of the mold is formed is coated with a (poly)oxyalkylene alkyl phosphoric acid compound that is a mold release agent.

In the step (I') in the second aspect of the present invention, the surface on the side where the uneven microstructure of the mold is formed is coated with a (poly)oxyalkylene alkyl phosphoric acid compound.

The step (I") in the third aspect of the present invention is the same as the step (I).

From the viewpoint that the steps (I), (I'), and (I") involve coating the mold with a mold release agent to be uniform and sufficiently thin, it is preferable that the following steps (I-1) and (I-2) be included:

(I-1) a step of dissolving a (poly)oxyalkylene alkyl phosphoric acid compound in a solvent to prepare a release treatment solution; and (I-2) a step of coating the surface of the mold with the release treatment solution, and drying the release treatment solution.

For the mold release agent including one or more kinds of the phosphoric ester compound used in the present invention, the pH of the aqueous solution when extracted with 50 mL of water with respect to 1 g of the mold release agent is 3.0 or more. If the pH is 3.0 or more, the fine uneven shape of the mold can be maintained well. The pH is more preferably 3.0 or more, and particularly preferably 3.5 or more. Further, the pH of the mold release agent is preferably 7.0 or less, more preferably 6.0 or less, and particularly preferably 5.0 or less. That is, the pH of the mold release agent is preferably from 3.0 to 7.0, more preferably from 3.5 to 6.0, and particularly preferably from 3.5 to 5.0.

The (poly)oxyalkylene alkyl phosphoric ester compound contains a trace amount of phosphoric acid as an impurity. If this concentration of the phosphoric acid is too high, there is a possibility that when the mold is left to stand in contact with the mold release agent, the mold is dissolved, and as a result, the fine uneven shape is changed or lost. In a case where the mold release agent makes the mold dissolved, the storage condition and the duration of the mold ranging from the release treatment of the mold to the transfer of the fine uneven shape, which is thus not preferable.

Accordingly, as a result of extensive studies, it has been found that if the pH of the mold release agent including a (poly)alkylene alkyl phosphoric ester compound is 3.0 or more, the mold is sufficiently inhibited from being dissolved even when the state of the mold release agent being in contact with the mold is maintained. The concentration of the phosphoric acid of the mold release agent in a case where the pH is 3.0 or more is 10 ppm or less.

That is, the concentration of the phosphoric acid in the mold release agent is preferably 70 ppm or less, and more preferably 10 ppm or less, or it may be 0 ppm.

(Mold)

The mold may be prepared by, for example, a method including the following steps (a) to (f):

(a) a step of anodizing an aluminum substrate in an electrolytic solution under a constant voltage to form an oxidized film on the surface of the aluminum substrate;

(b) a step of removing a part or all of the oxidized film to form pore generation spots of anodization on the surface of the aluminum substrate;

(c) a step of anodizing the aluminum substrate in the electrolytic solution again to form an oxidized film having pores at the pore generation spots;

(d) a step of increasing the diameters of the pores;

(e) a step of, after the step (d), performing anodization in the electrolytic solution again; and (f) a step of repeating the steps (d) and (e) to obtain a mold having anodized alumina oxide having plural pores, formed on an aluminum surface thereof.

Step (a):

As shown in FIG. 1, if an aluminum substrate 10 is anodized, an oxidized film 14 having pores 12 is formed.

Examples of the shape of the aluminum substrate include a roll shape, a circular tube shape, a flat plate shape, and a sheet shape.

Furthermore, in order to smoothen the surface state of the aluminum substrate, it is preferable that the aluminum substrate be polished by mechanical polishing, buffing, chemical polishing, electrolytic polishing (etching treatment), or the like. In addition, since the oil used in processing the aluminum substrate into a predetermined shape may be attached to the aluminum substrate, it is preferable that the aluminum substrate be pre-degreased before anodization.

The purity of the aluminum is preferably 99% or more, more preferably 99.5% or more, and particularly preferably 99.8% or more. If the purity of the aluminum is low, when anodized, an uneven structure large enough to scatter visible light may be formed due to segregation of impurities and the regularity of the pores obtained by anodization may be reduced in some cases.

Examples of the electrolytic solution include sulfuric acid, oxalic acid, and phosphoric acid.

When oxalic acid is used for the electrolytic solution, the concentration of the oxalic acid is preferably 0.7 M or less. When the concentration of the oxalic acid is more than 0.7 M, the current value is too high, which results in a rough surface of the oxidized film.

When the formation voltage is from 30 to 60 V, anodized alumina oxide having a high pore regularity with a period of 100 nm is obtained. When the formation voltage is higher or lower than this range, the pore regularity is likely to decline.

The temperature of the electrolytic solution is preferably 60° C. or lower, and more preferably 45° C. or lower. When the temperature of the electrolytic solution is higher than 60° C., a phenomenon called "burning" may occur or the regularity of the pores may be disturbed in some case as the pores are damaged or the surface is dissolved.

When sulfuric acid is used for the electrolytic solution, the concentration of the sulfuric acid is preferably 0.7 M or less. When the concentration of the sulfuric acid is more than 0.7 M, the current value becomes too high and it is impossible to maintain a constant voltage.

When the formation voltage is from 25 to 30 V, the anodized alumina having high pore regularity with an average interval of 63 nm is obtained. When the formation voltage is higher or lower than this range, the pore regularity is likely to decline.

The temperature of the electrolytic solution is preferably 30° C. or lower, and more preferably 20° C. or lower. When the temperature of the electrolytic solution is higher than 30° C., a phenomenon called "burning" may occur or the regularity of the pores may be disturbed in some cases as the pores are damaged or the pore surface is dissolved.

Step (b):

As shown in FIG. 1, once a part or all of the oxidized film 14 is removed and pore generation spots 16 of the anodization are obtained, the regularity of the pores can thereby be improved. Even in the state where all of the oxidized film 14 is not removed and a part thereof remains, if a part having already increased regularity remains in the oxidized film 14, an object of removing the oxidized film can be achieved.

Examples of the method for removing the oxidized film include a method of dissolving the oxidized film in a solution capable of selectively dissolving the oxidized film while not dissolving aluminum but removing the oxidized film. Examples of such a solution include a mixed solution of chromic acid/phosphoric acid.

Step (c):

As shown in FIG. 1, the aluminum substrate 10, from which the oxidized film is removed, is anodized again so as to form the oxidized film 14 having cylindrical pores 12.

The anodization may be carried out under the same conditions as in the step (a). Deeper pores can be formed from a longer time of the anodization. However, within a range in which the effect of the step (b) is not lost, it is possible to appropriately adjust the voltage of anodization, the kind of the electrolytic solution, the temperature, or the like in the step (c).

Step (d):

As shown in FIG. 1, the treatment to expand the diameter of the pores 12 (which will be hereinafter described as pore diameter-expanding treatment) is performed. The pore diameter-expanding treatment is a treatment for expanding the diameter of the pores obtained by anodization by immersing in the solution that dissolves the oxidized film. Examples of such a solution include an aqueous phosphoric acid solution of about 5% by weight, and the like.

If the pore diameter-expanding treatment is performed for a longer treatment time, the diameter of the pore becomes larger.

Step (e):

As shown in FIG. 1, anodization is performed again to form the cylindrical pores 12 having a small diameter extending downward from the bottom of the cylindrical pores 12.

The anodization may be carried out under the same conditions as in the step (a). Deeper pores can be formed from a longer time of anodization.

Step (f):

As shown in FIG. 1, the pore diameter-expanding treatment of the step (d) and the anodization of the step (e) are repetitively performed to form the oxidized film 14 having the pores 12, which have openings with decreasing diameter in the depth direction of the openings. Hence, the mold 18 having anodized alumina oxide (a porous oxidized film of aluminum (alumite)) formed on a surface of the aluminum substrate 10 is obtained. Preferably, the process is finished with the step (d).

The number of times or repetition is preferably 3 times or more, and more preferably 5 times or more, in total. When the number of times of repetition is twice or less, the diameter of the pores is reduced non-continuously. Thus, the effect of reducing the reflectivity of the moth-eye structure formed by using the anodized alumina oxide having such pores is insufficient.

Examples of the shape of the pores 12 substantially include a cone shape, a pyramid shape, and a column shape, and the shapes, of which the pore cross-sectional area that is perpendicular to the depth direction continuously decreases from the top in the depth direction, such as the cone shape and the pyramid shape, are preferred.

The average interval of the pores 12 is the wavelength of visible light or less, that is, 400 nm or less. The average interval of the pores 12 is preferably 20 nm or more.

The average interval of the pores 12 is a value obtained by measuring the intervals between adjacent pores 12 (distance from the center of the pore 12 to the center of the adjacent pore 12) at 50 locations, and then calculating the average of the values.

In a case where the average interval is 100 nm, the depth of the pores 12 is preferably from 80 to 500 nm, more preferably from 120 to 400 nm, and particularly preferably from 150 to 300 nm.

The depth of the pores 12 is a value obtained by measuring the distance between the lowest depth of the pores 12 and the highest peak of the convex portions existing between the pores 12 when observed at a magnification of 30000× using an electron microscope.

The aspect ratio of the pores 12 (the pore depth/the average interval between the pores) is preferably from 0.8 to 5.0, more preferably from 1.2 to 4.0, and particularly preferably from 1.5 to 3.0.

(Mold Release Agent)

In the first aspect of the present invention, the mold release agent includes one or more kinds of phosphoric ester compounds. The phosphoric ester compound has an ester group formed by dehydration/condensation of phosphoric acid and an alcohol in an organic phosphorus compound, and is a generic name of the compounds having a structure in which all or a part of three hydrogen atoms contained in the phosphoric acid are substituted with organic group(s). Examples of the phosphoric ester include a phosphoric acid monoester, a phosphoric acid diester, and a phosphoric acid triester, sequentially, having one, two, and three substituents. The (poly)oxyalkylene alkyl phosphoric acid compound is a compound formed by dehydration/condensation of a phosphoric acid and a poly(oxyalkylene)alkyl ether.

The (poly)oxyalkylene alkyl phosphoric acid compound that is a mold release agent undergoes an interaction with alumina to be adsorbed on the surface of the mold, thereby exhibiting releasability in the interface between the active energy ray curable resin composition and a cured product thereof. Further, the (poly)oxyalkylene alkyl phosphoric acid compound does not generate aggregates or the like unlike fluorine-containing silane compounds or the like, and consequently, even when the mold release agent covers the uneven microstructure of the surface of the mold, an excess amount of the mold release agent on the surface of the mold migrates to the active energy ray curable resin composition with a small number or times of the transfer, whereby the uneven microstructure of the surface of the mold is recovered.

The (poly)oxyalkylene alkyl phosphoric acid compound that is a mold release agent may be a compound that is the same as or different from an internal release agent to be added to the active energy ray curable resin composition as described later.

If the mold release agent and the internal release agent are the same compounds, stable surface characteristics are obtained from the initial transfer time.

Further, for example, in a case where a (poly)oxyalkylene alkyl phosphoric acid compound that is optimal as an internal release agent is different from a (poly)oxyalkylene alkyl phosphoric acid compound that allows easy dilution in a solvent to be used as a mold release agent and easy release treatment of the mold, the internal release agent and the mold release agent may be different compounds.

From the viewpoint of releasability, as the (poly)oxyalkylene alkyl phosphoric acid compound that is a mold release agent, a compound represented by the following formula (1) is preferred.

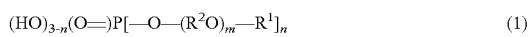

$$(HO)_{3-n}(O=)P[-O-(R^2O)_m-R^1]_n \quad (1)$$

In the formula, $R^1$ is an alkyl group, $R^2$ is alkylene group, m is an integer of 1 to 20, and n is an integer of 1 to 3.

$R^1$ is preferably an alkyl group having 1 to 20 carbon atoms, more preferably an alkyl group having 3 to 18 carbon atoms, and specifically preferably an alkyl group having 4 to 16 carbon atoms, and more preferably an alkyl group having 6 to 15 carbon atoms.

$R^2$ is preferably an alkylene group having 1 to 4 carbon atoms, more preferably an alkylene group having 2 to 3 carbon atoms, and specifically preferably ethylene or propylene, and more preferably ethylene.

m is more preferably an integer of 1 to 10.

The (poly)oxyalkylene alkyl phosphoric acid compound may be any one of a monoester (n=1), a diester (n=2), and a triester (n=3). Further, in a case of a diester or a triester, plural (poly)oxyalkylene alkyl groups in one molecule may be different from each other.

Examples of the commercially available products of the (poly)oxyalkylene alkyl phosphoric acid compound include the following:

Manufactured by Johoku Chemical Co., Ltd.: JP-506H (n≈1 to 2, m≈1, $R^1$=butyl, $R^2$=ethylene), Manufactured by Axel Plastic Research Laboratories, Inc.: Mold Wiz INT-1856 (the structure not disclosed), Manufactured by Nikko Chemicals Co., Ltd.: TDP-10 (n≈3, m≈10, $R^1$=C12 to 15, $R^2$=ethylene), TDP-8 (n≈3, m≈8, $R^1$=C12 to 15, $R^2$=ethylene), TDP-6 (n≈3, m≈6, $R^1$=C12 to 15, $R^2$=ethylene), TDP-2 (n≈3, m≈2, $R^1$=C12 to 15, $R^2$=ethylene), DDP-10 (n≈2, m≈10, $R^1$=C12 to 15, $R^2$=ethylene), DDP-8 (n≈2, m≈8, $R^1$=C12 to 15, $R^2$=ethylene), DDP-6 (n≈2, m≈6, $R^1$=C12 to 15, $R^2$=ethylene), DDP-4 (n≈2, m≈4, $R^1$=C12 to 15, $R^2$=ethylene), DDP-2 (n≈2, m≈2, $R^1$=C12 to 15, $R^2$=ethylene), TLP-4 (n≈3, m≈4, $R^1$=lauryl, $R^2$=ethylene), TCP-5 (n≈3, m≈5, $R^1$=cetyl, $R^2$=ethylene), DLP-10 (n≈3, m≈10, $R^1$=lauryl, $R^2$=ethylene).

Here, C12 to C15 means an alkyl group having 12 to 15 carbon atoms.

Among these, TDP-10, TDP-8, TDP-6, and TDP-2 are preferred, and TDP-10 and TDP-8 are more preferred.

The (poly)oxyalkylene alkyl phosphoric acid compounds may be used singly or in combination of two or more kinds thereof.

(Solvent)

The solvent may be chosen and used without a particular limitation as long as the (poly)oxyalkylene alkyl phosphoric acid compound can be uniformly dissolved therein, the wettability in the surface of the mold is good, and the solvent can be dried after applying the release treatment solution.

Examples of the solvent include water, alcohols (methanol, ethanol, isopropyl alcohol, and the like), ketones (acetone, methyl ethyl ketone, and the like), esters (ethyl acetate, butyl acetate, and the like), aliphatic hydrocarbons (hexane, heptane, and the like), aromatic hydrocarbons (benzene, toluene, and the like), and halogen-based solvents (dichloromethane). Among these, water and alcohols are preferred, and water is more preferred.

The solvents may be used singly or in combination of two or more kinds thereof.

It is preferable to prepare a release treatment solution using water in the solvent. It is thought that by using water, the potential of a discharge treatment of volatilized solvents or explosion and fire can be remarkably reduced, and the process is advantageous in terms of cost. Further, by using water in the solvent, it is also effective to use a certain amount of an alcohol or the like in combination therewith.

(Step (I-1))

The release treatment solution is obtained by dissolving the (poly)oxyalkylene alkyl phosphoric acid compound that is a mold release agent in a solvent. The concentration of the mold release agent may be any concentration by which the releasability can be achieved with a layer formed by the (poly) oxyalkylene alkyl phosphoric acid compound after optimizing by an applying method onto a mold, and then drying the release treatment solution.

The releasability can be sufficiently achieved when the thickness of the layer formed by the (poly)oxyalkylene alkyl phosphoric acid compound is about several angstroms. Even in a case where the thickness of the layer is several μm or more, only a prerequisite amount of the (poly)oxyalkylene alkyl phosphoric acid compound remains on the surface of the mold with several transfers, and an excess amount of the (poly)oxyalkylene alkyl phosphoric acid compound migrates to the side of a cured resin layer. Hence, an article having a stably uniform protrusion shape and surface characteristics can be obtained later.

The concentration of the mold release agent is preferably from 0.001 to 10% by weight, more preferably from 0.01 to 2% by weight, even more preferably from 0.01 to 1% by weight, and particularly preferably from 0.05 to 0.5% by weight, in the release treatment solution.

In addition, the release treatment solution may include an anti-foaming agent for the purpose of improving handleability.

The release treatment solution is preferably a homogeneous solution, and it also preferably has neither suspended matter nor turbidity since the suspended matter and turbidity themselves may become defects of the mold surface and cause poor appearance in the release treatment. The transparency of the release treatment solution can be measured using a turbidimeter or the like, and it is preferable that the particulate materials or turbidity be not substantially detected. For example, the turbidity (JIS K0101) may be preferably expressed to be 0 degrees.

(Step (I-2))

The applying method of the release treatment solution onto the mold is not particularly limited as long as the release treatment solution can be applied on the surface of the mold. Examples of the applying method include deep coating, spray coating, and rubbing using a wiper, with which a release treatment solution can be impregnated.

The drying of the release treatment solution is not limited as long as the solvent used in the release treatment solution can be sufficiently removed. The drying method is not particularly limited as long as the solvent can be sufficiently removed, but it is preferable to select an environment for drying according to the selected solvent.

Examples of the drying method include leaving to stand in a clean environment, drying in a high-temperature dryer, and drying under reduced pressure.

[Steps (II), (II'), and (II")]

In the step (II), an active energy ray curable resin composition including a polymerizable compound, a polymerization initiator and an internal release agent is interposed between the mold and the substrate and cured by the irradiation with active energy rays to form a cured resin layer having an uneven microstructure transferred thereon on the surface of the substrate, thereby obtaining an article having an uneven microstructure on a surface thereof.

The step (II') is the same as the step (II).

In the step (II"), an active energy ray curable resin composition including a polymerizable compound, a polymerization initiator and an internal release agent that is the same as the mold release agent is interposed between the mold and the substrate and cured by the irradiation with active energy rays to form a cured resin layer having an uneven microstructure transferred thereon on the surface of the substrate, thereby obtaining an article having an uneven microstructure on a surface thereof.

(Substrate)

Examples of the shape of the substrate include a film, a sheet, an injection molded product, and a press molded product.

Examples of the material of the substrate include a polycarbonate-based resin, a polystyrene-based resin, a polyester-based resin, an acrylic resin, a cellulose-based resin (triacetyl cellulose and the like), a polyolefin, and glass.

(Active Energy Ray Curable Resin Composition)

The active energy ray curable resin composition is a composition including a polymerizable compound, a polymerization initiator and an internal release agent.

The viscosity at 25° C. of the composition is preferably 10000 mPa·s or less, more preferably 5000 mPa·s or less, and even more preferably 2000 mPa·s or less. If the viscosity at 25° C. of the composition is 10000 mPa·s or less, the conformability of the composition into the uneven microstructure becomes better, and thus, the uneven microstructure can be transferred with good accuracy. The viscosity of the composition is measured at 25° C., using a rotary E type viscometer.

(Internal Release Agent)

When the active energy ray curable resin composition includes an internal release agent, the continuous transfer property can be increased.

The internal release agent is intended to improve the releasability of a cured product of the active energy ray curable resin composition from the surface of the mold, and its composition is not particularly limited as long as the internal release agent has compatibility with the active energy ray curable resin composition.

Examples of the internal release agent include a (poly) oxyalkylene alkyl phosphoric acid compound, a fluorine-containing compound, a silicone-based compound, a compound having a long-chain alkyl group, a polyalkylene wax, an amide wax, and Teflon (Teflon is a registered trade mark). These may be used singly or in combination of two or more kinds thereof. Among these, those having a (poly)oxyalkylene alkyl phosphoric acid compound as a main component are preferred.

When a (poly)oxyalkylene alkyl phosphoric acid compound that is the same as a mold release agent is included as the internal release agent, in particular, the releasability of a cured resin layer that is a cured product of the active energy ray curable resin composition from the mold becomes good.

Further, since the load during the release is very low, the damage of the uneven microstructure is small, and as a result, the uneven microstructure of the mold can be transferred efficiently with high accuracy.

From the viewpoint of releasability, the (poly)oxyalkylene alkyl phosphoric acid compound represented by the following formula (1) is preferred.

$$(HO)_{3-n}(O{=}\!\!\!=\!\!\!)P[-O-(R^2O)_m-R^1] \quad (1)$$

In the formula, $R^1$ is an alkyl group, $R^2$ is alkylene group, m is an integer of 1 to 20, and n is an integer of 1 to 3.

$R^1$ is preferably an alkyl group having 1 to 20 carbon atoms, more preferably an alkyl group having 3 to 18 carbon atoms, and specifically preferably an alkyl group having 4 to 16 carbon atoms, and more preferably an alkyl group having 6 to 15 carbon atoms.

$R^2$ is preferably an alkylene group having 1 to 4 carbon atoms, more preferably an alkylene group having 2 to 3 carbon atoms, and specifically preferably ethylene or propylene, and more preferably ethylene.

m is preferably an integer of 1 to 10.

The (poly)oxyalkylene alkyl phosphoric acid compound may be any one of a monoester (n=1), a diester (n=2), and a triester (n=3). Further, in a case of a diester or a triester, plural (poly)oxyalkylene alkyl groups in one molecule may be different from each other.

Examples of commercially available products of the (poly) oxyalkylene alkyl phosphoric acid compound include the following:

Manufactured by Johoku Chemical Co., Ltd.: JP-506H (n≈1 to 2, m≈1, $R^1$=butyl, $R^2$=ethylene), Manufactured by Axel Plastic Research Laboratories, Inc.: Mold Wiz INT-1856 (the structure not disclosed), Manufactured by Nikko Chemicals Co., Ltd.: TDP-10 (n≈3, m≈10, $R^1$=C12 to 15, $R^2$=ethylene), TDP-8 (n≈3, m≈8, $R^1$=C12 to 15, $R^2$=ethylene), TDP-6 (n≈3, m≈6, $R^1$=C12 to 15, $R^2$=ethylene), TDP-2 (n≈3, m≈2, $R^1$=C12 to 15, $R^2$=ethylene), DDP-10 (n≈2, m≈10, $R^1$=C12 to 15, $R^2$=ethylene), DDP-8 (n≈2, m≈8, $R^1$=C12 to 15, $R^2$=ethylene), DDP-6 (n≈2, m≈6, $R^1$=C12 to 15, $R^2$=ethylene), DDP-4 (n≈2, m≈4, $R^1$=C12 to 15, $R^2$=ethylene), DDP-2 (n≈2, m≈2, $R^1$=C12 to 15, $R^2$=ethylene), TLP-4 (n≈3, m≈4, $R^1$=lauryl, $R^2$=ethylene), TCP-5 (n≈3, m≈5, $R^1$=cetyl, $R^2$=ethylene), and DLP-10 (n≈3, m≈10, $R^1$=lauryl, $R^2$=ethylene).

Here, C12 to C15 means an alkyl group having 12 to 15 carbon atoms.

Among these, TDP-10, TDP-8, TDP-6, and TDP-2 are preferred, and TDP-6 and TDP-2 are more preferred.

The (poly)oxyalkylene alkyl phosphoric acid compound may be used as a single kind or a combination of two or more kinds.

The amount of the (poly)oxyalkylene alkyl phosphoric acid compound as an internal release agent in the active energy ray curable resin composition is preferably from 0.01 to 1% by weight, more preferably from 0.05 to 0.5% by weight, and even more preferably from 0.05 to 0.1% by weight, based on 100% by weight of the polymerizable compound. When the amount of the (poly)oxyalkylene alkyl phosphoric acid compound is 1% by weight or less, the reduction in the performance of the cured resin layer is inhibited. Further, the reduction in the adhesion to the substrate is also suppressed, and as a result, the residue of the resin on the mold (poor release) or the peeling-off of the cured resin layer from the article is inhibited. When the amount of the (poly) oxyalkylene alkyl phosphoric acid compound is 0.01% by weight or more, the releasability from the mold becomes sufficient and the residue of the resin on the mold (poor release) is inhibited.

The pH of the internal release agent is preferably 3.0 or more, more preferably 3.5 or more, and particularly preferably 3.5 or more, in order to maintain the fine uneven shape of the mold formed with alumina. Further, the pH of the internal release agent is preferably 7.0 or less, more preferably 6.0 or less, and particularly preferably 5.0 or less. That is, the pH of the internal release agent is preferably from 3.0 to 7.0, more preferably from 3.5 to 6.0, and particularly preferably from 3.5 to 5.0. The (poly)oxyalkylene alkyl phosphoric ester compound contains a trace amount of phosphoric acid as an impurity. If the concentration of the phosphoric acid is too high, there is a possibility that the number of times of transfer (number of times of revolution of a roll-shaped mold) is increased and the mold is rapidly dissolved, and as a result, the fine uneven shape is changed or lost, which is thus not preferable.

Accordingly, as a result of extensive studies, it was found that if the pH of the internal release agent including the (poly)alkylene alkyl phosphoric ester compound is 3.0 or more, there is substantially no deterioration of the fine uneven shape even with an increase in the number of times of transfer, the article can be stably produced over a long period of time. In a case of the pH of 3.0 or more, the concentration of the phosphoric acid in the internal release agent was 10 ppm or less.

That is, the concentration of the phosphoric acid in the internal release agent is preferably 70 ppm or less, and more preferably 10 ppm or less, or it may be 0 ppm.

The active energy ray curable resin composition may include a compound that improves the releasability, other than the (poly)oxyalkylene alkyl phosphoric acid compound, for the purpose of further improving the releasability. Examples of the component include a fluorine-containing compound, a silicone-based compound, a phosphoric ester-based compound, a compound having a long-chain alkyl group, and a compound including a solid wax (a polyalkylene wax, an amide wax, and Teflon powder (Teflon is a registered trade mark), and the like).

(Polymerizable Compound)

Examples of the polymerizable compound include monomers, oligomers, and reactive polymers having radical polymerizability and/or cationic polymerizability within the molecule.

Examples of the monomers having radical polymerizability include monofunctional monomers and polyfunctional monomers.

Specific examples of the monofunctional monomers include (meth)acrylate derivatives such as methyl(meth)acrylate, ethyl(meth)acrylate, propyl(meth)acrylate, n-butyl(meth)acrylate, i-butyl(meth)acrylate, s-butyl(meth)acrylate, t-butyl(meth)acrylate, 2-ethylhexyl(meth)acrylate, lauryl(meth)acrylate, alkyl(meth)acrylate, tridecyl(meth)acrylate, stearyl(meth)acrylate, cyclohexyl(meth)acrylate, benzyl(meth)acrylate, phenoxyethyl(meth)acrylate, isobornyl(meth)acrylate, glycidyl(meth)acrylate, tetrahydrofurfuryl(meth)acrylate, allyl(meth)acrylate, 2-hydroxyethyl(meth)acrylate, hydroxypropyl(meth)acrylate, 2-methoxyethyl(meth)acrylate, and 2-ethoxyethyl(meth)acrylate; (meth)acrylic acids and (meth)acrylonitrile; styrene and styrene derivatives such as α-methyl styrene; and (meth)acrylamides and (meth)acrylamide derivatives such as N,N-dimethyl(meth)acrylamide, N,N-diethyl(meth)acrylamide, and dimethylaminopropyl(meth)acrylamide. Among these, an alkyl(meth)acrylate, N,N-dimethyl(meth)acrylamide, and 2-hydroxyethyl(meth)acrylate are preferred, and an alkyl acrylate, N,N-dimethylacrylamide, and 2-hydroxyethyl acrylate are more preferred. These compounds may be used singly or in combination of two or more kinds thereof.

Examples of the polyfunctional monomers include bifunctional monomers such as ethylene glycol di(meth)acrylate, tripropylene glycol di(meth)acrylate, polyethylene glycol di(meth)acrylate, an ethylene oxide isocyanurate-modified di(meth)acrylate, triethylene glycol di(meth)acrylate, diethylene glycol di(meth)acrylate, neopentyl glycol di(meth) acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth)acryloxy-2-hydroxypropoxy)phenyl)propane, 1,2-bis(3-(meth)acryloxy-2-hydroxypropoxy)ethane, 1,4-bis(3-(meth)acryloxy-2-hydroxypropoxy)butane, dimethyloltricyclodecane di(meth)acrylate, bisphenol A ethylene oxide adduct di(meth)acrylate, bisphenol A propylene oxide adduct di(meth)acrylate, neopentyl glycol hydroxypivalate di(meth)acrylate, divinylbenzene, and methylene bisacrylamide; trifunctional monomers such as pentaerythritol tri(meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate, and ethylene oxide isocyanurate-modified tri(meth)acrylate; tetrafunctional or higher monomers such as condensation reaction mixtures of succinic acid/trimethylolethane/acrylic acid, pentaerythritol tetra(meth)acrylate, dipentaerythritol hexa(meth)acrylate, dipentaerythritol penta(meth)acrylate, EO-modified dipentaerythritol hexa(meth)acrylate, ditrimethylolpropane tetraacrylate, and tetramethylolmethane tetra(meth)acrylate; and bifunctional or higher urethane acrylates and bifunctional or higher polyester acrylates. Among these, pentaerythritol tri(meth)acrylate, pentaerythritol tetra(meth)acrylate, dipentaerythritol penta(meth)acrylate, dipentaerythritol hexa(meth)acrylate, EO-modified dipentaerythritol hexa(meth)acrylate, and polyethylene glycol di(meth)acrylate are preferred, and pentaerythritol triacrylate, pentaerythritol tetraacrylate, dipentaerythritol pentaacrylate, dipentaerythritol hexaacrylate, EO-modified dipentaerythritol hexaacrylate, and polyethylene glycol diacrylate are more preferred. These compounds may be used singly or in combination of two or more kinds thereof.

Examples of the monomers having cationic polymerizability include monomers having an epoxy group, an oxetanyl group, an oxazolyl group, a vinyloxy group, or the like, and monomers having an epoxy group are particularly preferred. Specific examples thereof include ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, trimethylolpropane triglycidyl ether, hydrogenated bisphenol A diglycidyl ether, bisphenol A PO 2-mol-added diglycidyl ether, 3-ethyl-3-hydroxymethyloxetane, 2-ethylhexyloxetane, xylene bisoxetane, 3-ethyl-3{[(3-ethyloxetan-3-yl)methoxy]methyl}oxetane, 2-hydroxyethylvinyl ether, 4-hydroxybutylvinyl ether, diethylene glycol monovinyl ether, and 2-ethylhexylvinyl ether.

Examples of the oligomers or reactive polymers include unsaturated polyesters such as a condensation product of an unsaturated dicarboxylic acid and a polyhydric alcohol; and polyester(meth)acrylates, polyether(meth)acrylates, polyol (meth)acrylates, epoxy(meth)acrylates, urethane(meth)acrylates, cationically polymerizable epoxy compounds, and homopolymers or copolymers of the aforementioned monomers having a radically polymerizable group on a side chain. Among these, epoxy(meth)acrylates and urethane(meth) acrylates are preferred, and urethane(meth)acrylates are more preferred.

As the polymerizable compound, a combination of radically polymerizable monomers or a combination of radically polymerizable monomers and cationically polymerizable monomers is preferred, and a combination of radically polymerizable monomers is more preferred.

(Polymerization Initiator)

In a case where a photocuring reaction is used, examples of the photopolymerization initiator include carbonyl compounds such as benzoin, benzoin methyl ether, benzoin ethyl ether, benzoin isopropyl ether, benzoin isobutyl ether, benzil, benzophenone, p-methoxybenzophenone, 2,2-diethoxyacetophenone, α,α-dimethoxy-α-phenylacetophenone, methyl phenylglyoxylate, ethyl phenylglyoxylate, 4,4'-bis(dimethylamino)benzophenone, 2-hydroxy-2-methyl-1-phenylpropan-1-one, and 1-hydroxy-cyclohexylphenyl ketone; sulfur compounds such as tetramethylthiuram monosulfide and tetramethylthiuram disulfide; and acylphosphine oxides such as 2,4,6-trimethylbenzoyl diphenylphosphine oxide and bis(2, 4,6-trimethylbenzoyl)-phenylphosphine oxide. Among these, 2-hydroxy-2-methyl-1-phenylpropan-1-one, 1-hydroxy-cyclohexyl-phenyl-ketone, 2,4,6-trimethylbenzoyl-diphenylphosphine oxide, and bis(2,4,6-trimethylbenzoyl)-phenylphosphine oxide are preferred, and 1-hydroxy-cyclohexyl-phenyl-ketone and bis(2,4,6-trimethylbenzoyl)-phenylphosphine oxide are more preferred. These may be used singly or in combination of two or more kinds thereof.

In a case where a thermal curing reaction is used, examples of the thermal polymerization initiator include organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate, and lauroyl peroxide; azo-based compounds such as azobisisobutyronitrile; and redox polymerization initiators obtained by combining an aforementioned organic peroxide with an amine such as N,N-dimethylaniline or N,N-dimethyl-p-toluidine. Among these, the organic peroxides or azo-based compounds are preferred, and the azo-based compounds are more preferred.

The amount of the polymerization initiator is preferably from 0.1 to 10% by weight based on 100% by weight of the polymerizable compound. If the amount of the polymerization initiator is less than 0.1% by weight, the polymerization proceeds poorly. If the amount of the polymerization initiator is more than 10% by weight, the cured film may be colored and the mechanical strength may be deteriorated in some cases.

(Other Components)

The active energy ray curable resin composition may also include, as necessary, additives such as unreactive polymers, active energy ray sol-gel reactive compositions, antistatic agents, and fluorine compounds for improving the anti-fouling properties, as well as fine particles and small amounts of solvents.

Examples of the unreactive polymers include acryl-based resins, styrene-based resins, polyurethanes, cellulose-based resins, polyvinyl butyral, polyesters, and thermoplastic elastomers.

Examples of the active energy ray sol-gel reactive compositions include alkoxysilane compounds and alkyl silicate compounds.

Examples of the alkoxysilane compounds include tetramethoxysilane, tetra-i-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxysilane.

Examples of the alkyl silicate compounds include methyl silicate, ethyl silicate, isopropyl silicate, n-propyl silicate, n-butyl silicate, n-pentyl silicate, and acetyl silicate.

For an article having an uneven microstructure on a surface thereof, it is known that if the surface is formed from a hydrophobic material, water superrepellency is obtained due to the lotus effect, whereas if the surface is formed from a hydrophilic material, superhydrophilicity is obtained.

(Hydrophobic Material)

In order to generate a water contact angle of the surface of the uneven microstructure of the cured resin layer to be 90° or more, it is preferable to use a composition containing a fluorine-containing compound or a silicone-based compound as an active energy ray curable resin composition capable of forming a hydrophobic material.

Fluorine-Containing Compound:

Examples of the fluorine-containing compound include fluorine-containing monomers, fluorine-containing silane compounds, fluorine-containing surfactants, and fluorine-containing polymers.

Examples of the fluorine-containing monomers include fluoroalkyl group-substituted vinyl monomers and fluoroalkyl group-substituted ring-opening polymerizable monomers.

Examples of the fluoroalkyl group-substituted vinyl monomers include fluoroalkyl group-substituted (meth)acrylates, fluoroalkyl group-substituted (meth)acrylamides, fluoroalkyl group-substituted vinyl ethers, and fluoroalkyl group-substituted styrenes.

Examples of the fluoroalkyl group-substituted ring-opening polymerizable monomers include fluoroalkyl group-substituted epoxy compounds, fluoroalkyl group-substituted oxetane compounds, and fluoroalkyl group-substituted oxazoline compounds.

Examples of the fluorine-containing silane compounds include 3,3,3-trifluoropropyltrimethoxysilane, 3,3,3-trifluoropropyltriacetoxysilane, dimethyl-3,3,3-trifluoropropylmethoxysilane, and tridecafluoro-1,1,2,2-tetrahydrooctyltriethoxysilane.

Examples of the fluorine-containing surfactants include fluoroalkyl group-containing anionic surfactants and fluoroalkyl group-containing cationic surfactants.

Examples of the fluorine-containing polymers include polymers of fluoroalkyl group-containing monomers, copolymers of fluoroalkyl group-containing monomers and poly(oxyalkylene) group-containing monomers, and copolymers of fluoroalkyl group-containing monomers and cross-linking reactive group-containing monomers. The fluorine-containing polymers may be copolymers obtained by copolymerization with other copolymerizable monomers.

Silicone-Based Compound:

Examples of the silicone-based compound include (meth)acrylic acid-modified silicones, silicone resins, and silicone-based silane coupling agents.

Examples of the (meth)acrylic acid-modified silicones include silicone (di)(meth)acrylates, and for example, products such as the silicone diacrylates "X-22-164", "X-22-1602", and the like manufactured by Shin-Etsu Chemical Co., Ltd. are used preferably.

(Hydrophilic Material)

In order to generate a water contact angle for the surface of the uneven microstructure of the cured resin layer that is 25° or less, it is preferable to use a composition containing at least a hydrophilic monomer as the active energy ray curable resin composition capable of forming a hydrophilic material. Furthermore, from the viewpoints of imparting abrasion resistance and water resistance, the composition preferably also includes a cross-linkable polyfunctional monomer. The hydrophilic monomer and the cross-linkable polyfunctional monomer may be the same compound (that is, a hydrophilic polyfunctional monomer). Moreover, the active energy ray curable resin composition may also include other monomers.

As the active energy ray curable resin composition capable of forming a hydrophilic material, it is more preferable to use a composition containing a tetrafunctional or higher polyfunctional (meth)acrylate, a bifunctional or higher hydrophilic (meth)acrylate, and if necessary, a monofunctional monomer.

Examples of the tetrafunctional or higher polyfunctional (meth)acrylate include ditrimethylolpropane tetra(meth)acrylate, pentaerythritol tetra(meth)acrylate, pentaerythritol ethoxytetra(meth)acrylate, dipentaerythritol hydroxypenta(meth)acrylate, dipentaerythritol hexa(meth)acrylate, a condensation reaction mixture of succinic acid/trimethylolethane/acrylic acid in a molar ratio of 1:2:4, urethane acrylates (EBECRYL 220, EBECRYL 1290, EBECRYL 1290K, EBECRYL 5129, EBECRYL 8210, EBECRYL 8301, and KRM 8200, all manufactured by Daicel-Cytec Co., Ltd.), polyether acrylates (EBECRYL 81 manufactured by Daicel-Cytec Co., Ltd.), modified epoxy acrylates (EBECRYL 3416 manufactured by Daicel-Cytec Co., Ltd.), and polyester acrylates (EBECRYL 450, EBECRYL 657, EBECRYL 800, EBECRYL 810, EBECRYL 811, EBECRYL 812, EBECRYL 1830, EBECRYL 845, EBECRYL 846, and EBECRYL 1870, all manufactured by Daicel-Cytec Co., Ltd.). These may be used singly or in combination of two or more kinds thereof.

The tetrafunctional or higher polyfunctional (meth)acrylate is preferably a pentafunctional or higher polyfunctional (meth)acrylate.

The proportion of the tetrafunctional or higher polyfunctional (meth)acrylate is preferably from 40 to 90% by weight, and from the viewpoints of water resistance and chemical resistance, it is more preferably from 50 to 90% by weight, and particularly preferably from 60 to 80% by weight, based on 100% by weight of the polymerizable compound. If the proportion of the tetrafunctional or higher polyfunctional (meth)acrylate is 40% by weight or more, the elastic modulus increases and the abrasion resistance are improved. If the proportion of the tetrafunctional or higher polyfunctional (meth)acrylate is 90% by weight or less, small cracks are unlikely to occur in the surface, and external appearance defects are unlikely to occur.

Examples of the bifunctional or higher hydrophilic (meth)acrylate include polyfunctional acrylates having a long-chain polyethylene glycol, such as ARONIX M-240 and ARONIX M-260 (both manufactured by Toagosei Co., Ltd.), NK ester AT-20E and NK ester ATM-35E (both manufactured by Shin-Nakamura Chemical Co., Ltd.), and polyethylene glycol dimethacrylate. These may be used singly or in combination of two or more kinds thereof.

In the polyethylene glycol di(meth)acrylate, the total of the average number of the repeating units of the polyethylene glycol chain in one molecule is preferably from 6 to 40, more preferably from 9 to 30, and particularly preferably from 12 to 20. If the average number of the repeating units of the polyethylene glycol chain is 6 or more, the hydrophilicity is sufficient, and the anti-fouling properties are improved. If the average number of the repeating units of the polyethylene glycol chain is 40 or less, the compatibility with the tetrafunctional or higher polyfunctional (meth)acrylate is improved, and the active energy ray curable resin composition is less likely to undergo separation.

The proportion of the bifunctional or higher hydrophilic (meth)acrylate is preferably from 20 to 80% by weight, and more preferably from 25 to 70% by weight, based on 100% by weight of the polymerizable compound. If the proportion of the bifunctional or higher hydrophilic (meth)acrylate is 20% by weight or more, the hydrophilicity becomes sufficient and the anti-fouling properties are improved. If the proportion of the bifunctional or higher hydrophilic (meth)acrylate is 80% by weight or less, the elastic modulus increases and the abrasion resistance is improved.

The monofunctional monomer is preferably a hydrophilic monofunctional monomer.

Examples of the hydrophilic monofunctional monomer include monofunctional (meth)acrylates having a polyethylene glycol chain in the ester group, such as M-20G, M-90G, and M-230G (all manufactured by Shin-Nakamura Chemical Co., Ltd.); monofunctional (meth)acrylates having a hydroxyl group in the ester group, such as hydroxyalkyl (meth)acrylates; monofunctional acrylamides; and cationic monomers such as methacrylamidopropyl trimethylammonium methyl sulfate and methacryloyloxyethyl trimethylammonium methyl sulfate.

In addition, as the monofunctional monomer, viscosity adjusting agents such as acryloyl morpholine and vinyl pyrrolidone; adhesion improving agents such as acryloyl isocyanate that improve the adhesion to the main product body; or the like may also be used.

The proportion of the monofunctional monomer is preferably from 0 to 20% by weight, and more preferably from 5 to 15% by weight, based on 100% by weight of the polymerizable compound. By using the monofunctional monomer, the adhesion between the substrate and the cured resin is improved. If the proportion of the monofunctional monomer is 20% by weight or less, satisfactory anti-fouling properties and abrasion resistance are realized without overly reducing the amount of the tetrafunctional or higher polyfunctional (meth)acrylate or the bifunctional or higher hydrophilic (meth)acrylate.

One kind or two or more kinds of the monofunctional monomers may be added to the active energy ray curable resin composition as a (co)polymerized low-polymerization degree polymer, in an amount of 0 to 35% by weight, based on 100% by weight of the polymerizable compound. Examples of such low-polymerization degree polymers include copolymerized oligomers (MG polymer manufactured by MRC Unitec Co., Ltd.) obtained by copolymerization of a monofunctional (meth)acrylate having a polyethylene glycol chain in the ester group, such as M-230G (manufactured by Shin-Nakamura Chemical Co., Ltd.), and methacrylamidopropyl trimethylammonium methyl sulfate in a ratio of 40/60.

(SP Value)

The SP value is a solubility parameter calculated according to the Fedors method [unit: $(J/cm^3)^{1/2}$], and it corresponds to a value expressed by the following equation.

$$\text{SP value}(\delta) = (\Delta H/V)^{1/2}$$

In the equation, $\Delta H$ represents molar evaporation heat [J] and V represents molar volume [$cm^3$]. The sum of the molar evaporation heat of atomic groups ($\Delta ei$), i.e., $\Sigma\Delta ei$ ($=\Delta H$), and the sum of the molar volume ($\Delta vi$), i.e., $\Sigma\Delta vi$ (V), may be used as $\Delta H$ and V, respectively, as described in "POLYMER ENGINEERING AND SCIENCE, 1974, Vol. 14, No. 2, ROBERT F. FEDORS (pages 151 to 153)," and thus the SP value is determined as $(\Sigma\Delta ei/\Sigma\Delta vi)^{1/2}$.

The difference between the SP values of the internal release agent and the mold release agent is preferably 2.0 or less, and more preferably 1.5 or less. A larger difference in the SP values indicates lower compatibility. At an initial stage in the preparation of an article having an uneven microstructure on a surface thereof, the release agent changes gradually from a mold release agent-rich state to an internal release agent-rich state. Therefore, there is a possibility that problems such as whitening of the surface if the compatibility between both is too low may occur.

(Preparation Apparatus)

Figure 2:
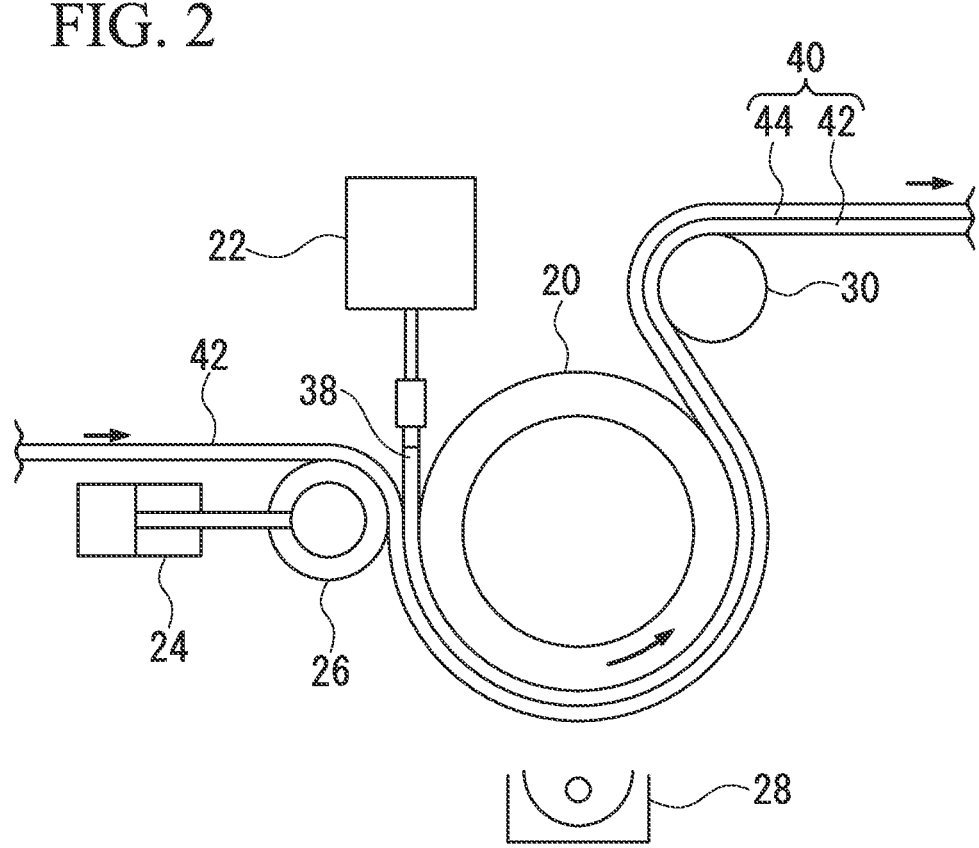
FIG. 2 is a constitutional view showing an example of an apparatus for preparing an article having an uneven microstructure on a surface thereof.

An article having an uneven microstructure on a surface thereof is prepared using, for example, a preparation apparatus shown in FIG. 2, in the following manner.

An active energy ray curable resin composition 38 is supplied from a tank 22 to a space between a roll-shaped mold 20 having an uneven microstructure (not shown in the drawing) on the surface, and a belt-shaped film 42 (substrate) that moves along the surface of the roll-shaped mold 20 and is driven by rotation of the roll-shaped mold 20.

The film 42 and the active energy ray curable resin composition 38 are nipped between the roll-shaped mold 20 and a nip roll 26, with the nip pressure being adjusted using a pneumatic cylinder 24, so that the active energy ray curable resin composition 38 is able to flow uniformly through the space between the film 42 and the roll-shaped mold 20, while filling the concave portions of the uneven microstructure on the roll-shaped mold 20.

By irradiating active energy rays onto the active energy ray curable resin composition 38 through the film 42, using an active energy ray irradiation device 28 positioned beneath the roll-shaped mold 20, thereby curing the active energy ray curable resin composition 38, a cured resin layer 44 is formed onto which the uneven microstructure from a surface of the roll-shaped mold 20 has been transferred.

Figure 3:
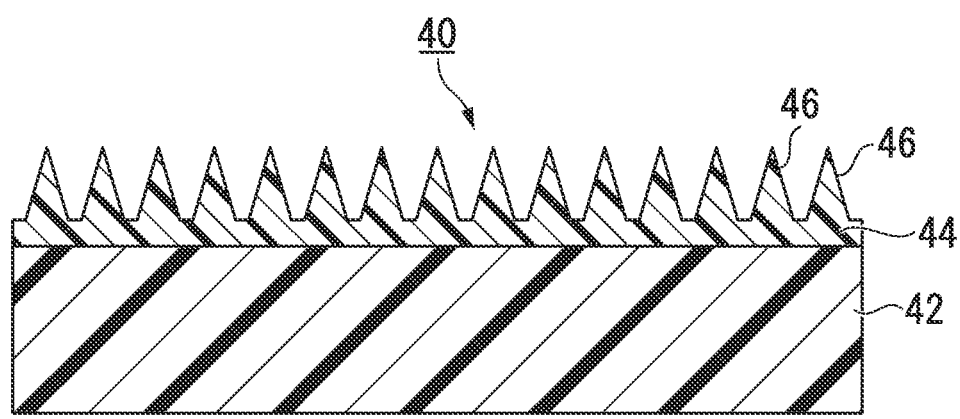
FIG. 3 is a cross-sectional view showing an example of an article having the uneven microstructure on the surface thereof.

A release roll 30 peels the film 42, which has the cured resin layer 44 formed on the surface, from the roll-shaped mold 20, thereby obtaining an article 40 shown in FIG. 3.

The active energy ray irradiation device 28 is preferably a high-pressure mercury lamp, a metal halide lamp, a fusion lamp, or the like, and in these cases, the amount of irradiated energy is preferably from 100 to 10000 mJ/$cm^2$.

(Article)

FIG. 3 is a cross-sectional view illustrating one example of the article 40 having an uneven microstructure on a surface thereof.

The film 42 is a light transmissive film. Examples of the film material include polycarbonates, polystyrene-based resins, polyesters, polyurethane, acryl-based resins, polyether sulfone, polysulfone, polyether ketone, cellulose-based resins (triacetyl cellulose and the like), polyolefins, and alicyclic polyolefins.

The cured resin layer 44 is a film formed from the cured product of the active energy ray curable resin composition and has an uneven microstructure on a surface thereof.

When a mold of anodized alumina oxide is used, the uneven microstructure on the surface of the article 40 is formed by transfer of the uneven microstructure from the surface of the anodized alumina oxide, and has plural convex portions 46 formed from the cured product of the active energy ray curable resin composition.

The uneven microstructure is preferably a so-called moth-eye structure which contains an array of at least two substantially conical or pyramidal protrusions (convex portions). It is known that in a moth-eye structure in which the interval between the protrusions is not more than the wavelength of visible light, the refractive index increases continuously from the refractive index of air to the refractive index of the material, thereby becoming an effective anti-reflective means.

The average spacing between the convex portions is typically not more than the wavelength of visible light, that is, 400 nm or less. When the convex portions are formed using an anodized alumina oxide mold, the average interval between the convex portions is from approximately 100 to 200 nm, and therefore, a value of 250 nm or less is particularly preferable.

From the viewpoint of ease of formation of the convex portions, the average interval between the convex portions is preferably 20 nm or more.

The average interval between the convex portions is determined by using electron microscope observation to measure the intervals between adjacent convex portions (that is, the distance from the center of one convex portion to the center of an adjacent convex portion) at 50 locations, and then calculating the average of the values.

In a case where the average interval is 100 nm, the average height of the convex portions is preferably from 80 to 500 nm, more preferably from 120 to 400 nm, and particularly preferably from 150 to 300 nm. If the height of the convex portions is 80 nm or more, the reflectivity is sufficiently decreased and the wavelength dependency of the reflectivity is less. If the height of the convex portions is 500 nm or less, the abrasion resistance of the convex portions becomes favorable.

The height of the convex portions is a value obtained by measuring the distance between the highest peak of the convex portions and the lowest depth of the concave portions that exist between the convex portions when observed at a magnification of 30000× using an electron microscope.

The aspect ratio of the convex portions (height of the convex portions/average interval between the convex portions) is preferably from 0.8 to 5.0, more preferably from 1.2 to 4.0, and particularly preferably from 1.5 to 3.0. If the aspect ratio of the convex portions is 1.0 or more, the reflectivity is sufficiently decreased. If the aspect ratio of the convex portions is 5.0 or less, abrasion resistance of the convex portions becomes favorable.

The shape of the convex portions is preferably a shape in which the cross-sectional area of the convex portion in a direction orthogonal to the height direction increases continuously in the depth direction from the uppermost surface, that is, a shape in which the cross-sectional shape of the convex portion in the height direction is a triangular, trapezoidal, or bell shape, or the like.

The difference between the refractive index of the cured resin layer 44 and the refractive index of the film 42 is preferably 0.2 or less, more preferably 0.1 or less, and particularly preferably 0.05 or less. If the difference in the refractive indices is 0.2 or less, the reflection at the interface between the cured resin layer 44 and the film 42 is inhibited.

When a surface has an uneven microstructure, it is known that if the surface is formed from a hydrophobic material, water superrepellency is obtained due to the Lotus effect, whereas if the surface is formed from a hydrophilic material, superhydrophilicity is obtained.

When the material of the cured resin layer 44 is hydrophobic, the water contact angle of the surface of the uneven microstructure is preferably 90° or more, more preferably 110° or more, and particularly preferably 120° or more. If the water contact angle is 90° or more, water soiling is unlikely to adhere to the surface and satisfactory anti-fouling properties are achieved. Further, because water is unlikely to adhere to the surface, an anti-icing effect can be expected.

When the material of the cured resin layer 44 is hydrophilic, the water contact angle of the surface of the uneven microstructure is preferably 25° or less, more preferably 23° or less, and particularly preferably 21° or less. If the water contact angle is 25° or less, any soiling adhered to the surface can be washed off with water, and because oil-based soiling is unlikely to adhere, satisfactory anti-fouling properties can be achieved. In terms of suppressing deformation of the uneven microstructure caused by water absorption of the cured resin layer 44, and the associated increase in the reflectance, the water contact angle is preferably 3° or more.

(Uses)

Examples of the uses of the article 40 include anti-reflective products, anti-fogging products, anti-fouling products, and water repellent products, and more specifically anti-reflective films for displays, clock dial plates, touch panel members, humidity control members, antimicrobial members, sanitary members, automobile meter covers, automobile mirrors, automobile windows, light extraction efficiency improvement members for organic and inorganic electroluminescent devices, and solar cell members.

(Actions and Effects)

In the method for preparing an article having an uneven microstructure on a surface thereof of the present invention, since the active energy ray curable resin composition includes an internal release agent, the releasability of the mold from the cured resin layer can be maintained even after plural number of times of transfer. Further, since a surface on the side where the uneven microstructure of the mold is formed is coated with a (poly)oxyalkylene alkyl phosphoric acid compound that is a mold release agent, the releasability at an initial time of transfer becomes favorable in a case where the uneven microstructure of the mold is transferred to the surface of the article, and further, an article having an uneven microstructure on a surface thereof can be stably prepared with good productivity even in a case where transfer is repeatedly conducted.

EXAMPLES

Hereinbelow, the present invention will be described in detail with reference to Examples, but it is in no way limited by these Examples.

(Measurement of Concentration of Phosphoric Acid and pH)

1 g of a mold release agent was dissolved in 50 mL of chloroform, 50 mL of water was added thereto, and the mixed liquid was thoroughly stirred with a separating funnel (water extraction test).

Subsequently, after leaving to stand overnight, the organic layer and the aqueous layer (aqueous solution) were separated, and the concentration of the phosphoric acid in the aqueous solution was measured by means of ion chromatography ("DX-500" manufactured by Nippon Dionex K. K.).

In addition, the pH of the aqueous solution was measured under the condition of 25° C. using a pH meter ("Kastani LAB" manufactured by Horiba, Ltd.).

(Measurement of Decrease Rate Due to Mold Dissolution)

An immersion test was carried out by immersing the mold in a mold release agent at 50° C. for 22 hours.

After the immersion test, the mold was taken out and washed with acetone and chloroform. The weight of the mold before the immersion test and after the washing was measured, and the decrease rate was determined by the following equation:

Decrease rate (%)={(Weight of the mold before the immersion test/Weight of the mold after the washing)}×100

(Confirmation of Appearance after Applying and Drying)

As the release treatment solution, a 0.1% by weight aqueous isopropyl alcohol solution of the mold release agent was prepared. Then, the mold was dip-coated with a release treatment solution, and the surface of the mold after drying was observed.

◯: There were no traces of dripping or the like and the surface was coated uniformly.

x: Traces of dripping, whitening, and the like were observed.

(SP Value of Release Agent)

Calculation of the SP value of the phosphoric ester compound used as the mold release agent was carried out by a Fedors method.

The results thereof are shown in Table 1.

(Releasability)

The transfer test as described later was carried out repeatedly in one mold, and the peel force during the release from the mold and the adhesion of the resin to the surface of the mold were evaluated. The peel force was measured in accordance with a 90° pulling peel described in JIS Z0237, and a case where the peel force was more than 30 N/m was denoted as Releasability x.

◯: The peel force was small, easy release from the mold was able to be conducted, and there was no adhesion of the resin to the mold.

x: The peel force was large or adhesion of the resin to the mold is observed.

(Transfer Test)

10 μL of the active energy ray curable resin composition was dropped onto the side where the uneven microstructure of the mold was formed, and a polyethylene terephthalate (which is hereafter described as PET) film was coated thereon. Then, while a load of 50 N was applied, curing was performed using an UV irradiation device (high-pressure mercury lamp: integral of light of 1100 mJ/cm$^2$). Subsequently, the formed cured resin layer was peeled, together with the PET film, from the mold, thereby obtaining an article having the uneven microstructure transferred to the surface of the PET film.

(Water Contact Angle)

Using a contact angle measurement device (DM301 manufactured by Kyowa Interface Science Co., Ltd.), 1 μL of water was dropped onto the surface of the article on the side where the uneven microstructure was formed, the water contact angle was measured 3 seconds after the water had been dropped, for 5 seconds at an interval of 1 second, and an average value thereof was determined. Moreover, the location onto which the water was dropped was changed, the same operations were repeated three times, and an average value of the three values in total thus obtained was calculated.

(Times for Stabilization of Reflectivity Spectrum)

For a sample prepared by roughening the surface on the side where the uneven microstructure was not formed, and then painting the roughened surface in matt black, the reflectivity spectrum of the surface of the cured resin layer at an incident angle of 5° within a wavelength range from 380 to 780 nm was measured using a spectrophotometer (U-4000 manufactured by Hitachi, Ltd.).

It is generally known that the reflectivity spectrum of the uneven microstructure has a change in the configuration when the height of the unevenness or the cross-sectional shape of the unevenness of the uneven microstructure is changed. Therefore, it is preferable that the change in the reflectivity spectrum due to the number of times of transfer be small and the reflectivity spectrum be stabilized by a small number of times of transfer.

For the article, the reflectivity spectrum was measured at 3 locations, changing the measurement locations each time, and an average value thereof was calculated. The times at which the change of the reflectivity spectrum depending on increase in the number of times of transfer was not observed, was denoted as the times for stabilization of the reflectivity spectrum.

Production Example

The respective components were mixed in the proportions shown below, based on 100% by weight of the polymerizable compound to prepare a base composition A.

DPHA: Dipentaerythritol hexaacrylate (NKester A-DPH manufactured by Shin-Nakamura Chemical Co., Ltd.); 25% by weight, PETA: Pentaerythritol triacrylate (NEW FRONTIER PET-3, manufactured by Dai-Ichi Kogyo Seiyaku Co., Ltd.); 25% by weight, DPEA-12: EO-modified dipentaerythritol hexaacrylate (KAYARAD DPEA-12 manufactured by Nippon Kayaku Co., Ltd.); 25% by weight, PEGDA-14EO: Polyethylene glycol diacrylate (NKester A-600 manufactured by Shin-Nakamura Chemical Co., Ltd.); 25% by weight, IRGACURE 184: 1-Hydroxycyclohexylphenyl ketone (IRGACURE 184 manufactured by BASF); 1.0% by weight, IRGACURE 819: Bis(2,4,6-trimethylbenzoyl)-phenylphosphine oxide (IRGACURE 819 manufactured by BASF); 0.5% by weight.

Preparation Example

An aluminum plate (purity of 99.99%) having a size of 50 mm×50 mm×0.3 mm in thickness that had been electrolytically polished in a perchloric acid/ethanol mixed solution (¼ volume ratio) was prepared.

Step (a):

The aluminum plate was subjected to anodization in a 0.3 M aqueous oxalic acid solution for 6 hours under a direct current of 40 V and at a temperature of 16° C.

Step (b):

The aluminum plate having an oxidized film formed thereon was immersed in a mixed aqueous 6% by weight phosphoric acid/1.8% by weight chromic acid solution for 3 hours to remove the oxidized film.

Step (c):

The aluminum plate was subjected to anodization in a 0.3 M aqueous oxalic acid solution for 30 seconds under a direct current of 40 V and at a temperature of 16° C.

Step (d):

The aluminum plate having an oxidized film formed thereon was immersed in a 5% by weight aqueous phosphoric acid solution at 32° C. for 8 minutes to carry out a pore diameter expansion treatment.

Step (e):

The aluminum plate was subjected to anodization in a 0.3 M aqueous oxalic acid solution for 30 seconds under a direct current of 40 V and at a temperature of 16° C.

Step (f):

The steps (d) and (e) were repeated five times in total to obtain a mold a having, on the surface, an anodized alumina oxide having approximately conical pores with an average interval (period) of pores of 100 nm and a depth of 230 nm formed on the surface thereof.

Step (g):

The aqueous phosphoric acid solution on the surface of the mold a was gently washed out using a shower and then the mold a was immersed in running water for 10 minutes.

Step (h):

Air was jetted on the mold a using air gun to remove the water droplets adhered onto the surface of the mold a.

Example 1

TDP-2 (manufactured by Nikko Chemicals, in the formula (1), $R^1$=an alkyl group having 12 to 15 carbon atoms, $R^2$=an alkylene group having 2 carbon atoms, n=2 to 3, m=2) as an internal release agent was added to a base composition A such that the amount of the internal release agent was 0.1% by weight based on 100% by weight of the polymerizable compound, thereby preparing an active energy ray curable resin composition.

TDP-2 (manufactured by Nikko Chemicals Co., Ltd.) as a mold release agent was dissolved in isopropyl alcohol to prepare a release treatment solution in which the concentration of the mold release agent was 0.1% by weight.

The mold a was immersed in a release treatment solution for 10 minutes, then slowly pulled up, and left to stand for 6 hours or more to dry the release treatment solution.

The transfer test was carried out using the active energy ray curable resin composition to evaluate the releasability. Further, for the obtained article, the water contact angle, and the times for stabilization of the reflectivity spectrum were measured. The results are shown in Table 2.

Example 2

TDP-2 (manufactured by Nikko Chemicals Co., Ltd.) as an internal release agent was added to a base composition A such that the amount of the internal release agent was 0.5% by weight based on 100% by weight of the polymerizable compound, thereby preparing an active energy ray curable resin composition.

TDP-2 (manufactured by Nikko Chemicals Co., Ltd.) as a mold release agent was dissolved in isopropyl alcohol to prepare a release treatment solution in which the concentration of the mold release agent was 0.02% by weight.

Hereinafter, the release treatment of the mold was carried out in the same manner as in Example 1, and evaluation was also carried out in the same manner as in Example 1. The evaluation results are shown in Table 2.

Example 3

TDP-2 (manufactured by Nikko Chemicals Co., Ltd.) as an internal release agent was added to a base composition A such that the amount of the internal release agent was 0.02% by weight based on 100% by weight of the polymerizable compound, thereby preparing an active energy ray curable resin composition.

TDP-2 (manufactured by Nikko Chemicals Co., Ltd.) as a mold release agent was dissolved in isopropyl alcohol to prepare a release treatment solution in which the concentration of the mold release agent was 1.0% by weight.

Hereinafter, the release treatment of the mold was carried out in the same manner as in Example 1, and evaluation was also carried out in the same manner as in Example 1. The evaluation results are shown in Table 2.

Example 4

TDP-2 (manufactured by Nikko Chemicals Co., Ltd.) as an internal release agent was added to a base composition A such that the amount of the internal release agent was 0.1% by weight based on 100% by weight of the polymerizable compound, thereby preparing an active energy ray curable resin composition.

TDP-8 (manufactured by Nikko Chemicals, in the formula (1), $R^1$=an alkyl group having 12 to 15 carbon atoms, $R^2$=an alkylene group having 2 carbon atoms, n=2 to 3, m=8) as a mold release agent was dissolved in water to prepare a release treatment solution in which the concentration of the mold release agent was 0.1% by weight.

Hereinafter, the release treatment of the mold was carried out in the same manner as in Example 1, and evaluation was also carried out in the same manner as in Example 1. The evaluation results are shown in Table 2.

Example 5

TDP-2 (manufactured by Nikko Chemicals Co., Ltd.) as an internal release agent was added to a base composition A such that the amount of the internal release agent was 0.02% by weight based on 100% by weight of the polymerizable compound, thereby preparing an active energy ray curable resin composition.

TDP-8 (manufactured by Nikko Chemicals Co., Ltd.) as a mold release agent was dissolved in water to prepare a release treatment solution in which the concentration of the mold release agent was 0.02% by weight.

Hereinafter, the release treatment of the mold was carried out in the same manner as in Example 1, and evaluation was also carried out in the same manner as in Example 1. The evaluation results are shown in Table 2.

Example 6

TDP-2 (manufactured by Nikko Chemicals Co., Ltd.) as an internal release agent was added to a base composition A such that the amount of the internal release agent was 0.5% by weight based on 100% by weight of the polymerizable compound, thereby preparing an active energy ray curable resin composition.

TDP-8 (manufactured by Nikko Chemicals Co., Ltd.) as a mold release agent was dissolved in water to prepare a release treatment solution in which the concentration of the mold release agent was 1.0% by weight.

Hereinafter, the release treatment of the mold was carried out in the same manner as in Example 1, and evaluation was also carried out in the same manner as in Example 1. The evaluation results are shown in Table 2.

Example 7

TDP-8 (manufactured by Nikko Chemicals Co., Ltd.) as an internal release agent was added to a base composition A such that the amount of the internal release agent was 0.1% by weight based on 100% by weight of the polymerizable compound, thereby preparing an active energy ray curable resin composition.

TDP-8 (manufactured by Nikko Chemicals Co., Ltd.) as a mold release agent was dissolved in water to prepare a release treatment solution in which the concentration of the mold release agent was 0.1% by weight.

Hereinafter, the release treatment of the mold was carried out in the same manner as in Example 1, and evaluation was also carried out in the same manner as in Example 1. The evaluation results are shown in Table 2.

Example 8

TDP-8 (manufactured by Nikko Chemicals Co., Ltd.) as an internal release agent was added to a base composition A such that the amount of the internal release agent was 0.02% by weight based on 100% by weight of the polymerizable compound, thereby preparing an active energy ray curable resin composition.

TDP-8 (manufactured by Nikko Chemicals Co., Ltd.) as a mold release agent was dissolved in water to prepare a release treatment solution in which the concentration of the mold release agent was 0.02% by weight.

Hereinafter, the release treatment of the mold was carried out in the same manner as in Example 1, and evaluation was also carried out in the same manner as in Example 1. The evaluation results are shown in Table 2.

Example 9

TDP-8 (manufactured by Nikko Chemicals Co., Ltd.) as an internal release agent was added to a base composition A such that the amount of the internal release agent was 0.5% by weight based on 100% by weight of the polymerizable compound, thereby preparing an active energy ray curable resin composition.

TDP-8 (manufactured by Nikko Chemicals Co., Ltd.) as a mold release agent was dissolved in water to prepare a release treatment solution in which the concentration of the mold release agent was 1.0% by weight.

Hereinafter, the release treatment of the mold was carried out in the same manner as in Example 1, and evaluation was also carried out in the same manner as in Example 1. The evaluation results are shown in Table 2.

Comparative Example 1

In the same manner as in Example 1 except that the release treatment of the mold was not carried out, evaluation was carried out in the same manner as in Example 1. The first transfer caused poor release, and therefore, an article for evaluation could not be obtained. The evaluation results are shown in Table 3.

Comparative Example 2

In the same manner as in Example 1 except that an internal release agent was not added to the base composition A, evaluation was carried out in the same manner as in Example 1. The first transfer could be performed, but the fifth transfer caused poor release, and therefore, it could be seen that a continuous transfer property was deteriorated. The evaluation results are shown in Table 3.

Comparative Example 3

0.1% by weight of OPTOOL DSX (manufactured by Daikin Industries, Ltd.) that is a fluorine-containing silane compound as a mold release agent was dissolved in OPTOOL HD-ZV (manufactured by Daikin Industries, Ltd.) that is a perfluoropolyether-based solvent to prepare a release treatment solution.

Hereinafter, in the same manner as in Example 1, the release treatment of the mold was carried out and evaluation was carried out in the same manner as in Example 1. The evaluation results are shown in Table 3.

There was no problem in the releasability, but the surface of the film having the uneven microstructure of the mold transferred thereto had a high contact angle due to the effect of the OPTOOL DSX, and even when the number of times of transfer reached the $100^{th}$ the contact angle was gradually decreasing. In addition, its reflectivity spectrum was also slowly changing, and even when the number of times of transfer reached the $100^{th}$, the change slowly proceeded.

TABLE 1

| | Product name | Compound | pH | Concentration of phosphoric acid [ppm] | Dissolution test Reduction rate | Appearance after applying with a 0.1% by weight IPA solution and drying | SP value |
|---|---|---|---|---|---|---|---|
| Release agent Example 1 | NIKKOL TDP-2 (manufactured by Nikko Chemicals Co., Ltd.) | Polyoxyethylene alkyl ether phosphoric ester (2EO), C12 to C15 | 3.8 | 1.9 | 0.01 | ○ | 17.76 to 17.80 |
| Release agent Example 2 | NIKKOL TDP-6 (manufactured by Nikko Chemicals Co., Ltd.) | Polyoxyethylene alkyl ether phosphoric ester (6EO), C12 to C15 | 3.7 | 5 | 0.01 | ○ | 18.19 to 18.26 |
| Release agent Example 3 | NIKKOL TDP-8 (manufactured by Nikko Chemicals Co., Ltd.) | Polyoxyethylene alkyl ether phosphoric ester (8EO), C12 to C15 | 3.5 | 9 | 0.01 | ○ | 18.32 to 18.39 |
| Release agent Example 4 | CRODAFOS O3A-LQ-(JP) (manufactured by Croda International Plc) | Polyoxyethylene oleyl ether phosphoric acid (3EO) | 2.9 | 120 | 0.33 | ○ | 17.28 |
| Release agent Example 5 | Mold Wiz INT-1856 (manufactured by Axel Plastic Research Laboratories Inc.) | Condensate formed by combining a modified aliphatic acid and an organic phosphite ester with a synthetic resin, glyceride, and a derivative of an organic acid | 2.5 | 130 | 0.41 | x | — (Details of the structure are not clear) |
| Release agent Example 6 | JP-506H (manufactured by Johoku Chemical Co., Ltd.) | Butyl glycol ether acid phosphate | 1.5 | 80 | 0.41 | ○ | 18.53 to 19.53 |

TABLE 2

|  |  | Example 1 | Example 2 | Example 3 | Example 4 | Example 5 | Example 6 | Example 7 | Example 8 | Example 9 |
|---|---|---|---|---|---|---|---|---|---|---|
| Internal release agent | TDP-2 | 0.1% by weight | 0.5% by weight | 0.02% by weight | 0.1% by weight | 0.02% by weight | 0.5% by weight |  |  |  |
|  | TDP-8 |  |  |  |  |  |  | 0.1% by weight | 0.02% by weight | 0.5% by weight |
| Release treatment solution | TDP-2/ IPA solution | 0.1% by weight | 0.02% by weight | 1.0% by weight |  |  |  |  |  |  |
|  | TDP-8/aqueous solution |  |  |  | 0.1% by weight | 0.02% by weight | 1.0% by weight | 0.1% by weight | 0.02% by weight | 1.0% by weight |
|  | OPTOOL DSX/HD-ZV |  |  |  |  |  |  |  |  |  |
| Releasability | 1st | ○ | ○ | ○ | ○ | ○ | ○ | ○ | ○ | ○ |
|  | 2nd | ○ | ○ | ○ | ○ | ○ | ○ | ○ | ○ | ○ |
|  | 5th | ○ | ○ | ○ | ○ | ○ | ○ | ○ | ○ | ○ |
|  | 1000th | ○ | ○ | ○ | ○ | ○ | ○ | ○ | ○ | ○ |
| Contact angle | 1st | 20° | 20° | 19° | 19° | 20° | 19° | 19° | 19° | 19° |
|  | 2nd | 20° | 20° | 20° | 22° | 22° | 21° | 21° | 21° | 21° |
|  | 5th | 20° | 20° | 20° | 22° | 21° | 22° | 21° | 21° | 21° |
| Times for stabilization of reflection spectrum |  | 3 | 3 | 4 | 3 | 2 | 3 | 3 | 2 | 4 |

TABLE 3

|  |  | Comparative Example 1 | Comparative Example 2 | Comparative Example 3 |
|---|---|---|---|---|
| Internal release agent | TDP-2 | 0.1% by weight |  | 0.1% by weight |
|  | TDP-8 |  |  |  |
| Release treatment solution | TDP-2/IPA solution |  | 0.1% by weight |  |
|  | TDP-8/ aqueous solution |  |  |  |
|  | OPTOOL DSX/HD-ZV |  |  | 1.0% by weight |
| Releasability | 1st | x | ○ | ○ |
|  | 2nd | — | ○ | ○ |
|  | 5th | — | x | ○ |
|  | 1000th | — | — | ○ |
| Contact angle | 1st | — | 20° | 54° |
|  | 2nd | — | 20° | 51° |
|  | 5th | — | — | 38° |
| Times for stabilization of reflection spectrum |  | — | — | >100th |

*"—" means that the sample cannot be peeled due to poor release, and thus, it cannot be measured.

As described above, in Examples 1 to 9, by using an active energy ray curable resin composition including a (poly)oxyalkylene alkyl phosphoric acid compound as an internal release agent as well as a release treatment solution including a (poly)oxyalkylene alkyl phosphoric acid compound as a mold release agent to carry out a release treatment, good releasability is realized, and therefore, an article with stable surface characteristics and optical characteristics with a small number of times of transfer could be obtained.

INDUSTRIAL APPLICABILITY

The method for preparing an article having an uneven microstructure on a surface thereof of the present invention is useful in efficient production of an antireflective article, an anti-fogging article, an anti-fouling article, or a water-repellent article.

REFERENCE SIGNS LIST

14 Oxidized film (anodized alumina oxide)
18 Mold
20 Roll-shaped mold
38 Active energy ray curable resin composition
40 Article
42 Film (substrate)
44 Cured resin layer

The invention claimed is:

1. A method for preparing an article having an uneven microstructure on a surface thereof, comprising the following steps (I) and (II):
(I) a step of coating a surface of a mold having an uneven microstructure formed from an anodized alumina oxide on a surface thereof with a release treatment solution comprising a mold release agent, where the mold release agent consists of one or more (poly)oxyalkylene alkyl phosphoric ester compounds, where the pH of an aqueous solution resulting from extraction of 1 g of the mold release agent with 50 mL of water is 3.0 or more; and
(II) a step of, after the step (I), interposing an active energy ray curable resin composition comprising a polymerizable compound, a polymerization initiator, and an internal release agent between the mold and a substrate, and curing the active energy ray curable resin composition by irradiating the composition with active energy rays to form a cured resin layer having the uneven microstructure transferred thereto on the surface of the substrate, thereby obtaining an article having an uneven microstructure on a surface thereof,
wherein the (poly)oxyalkylene alkyl phosphoric ester compound is of a formula (1)

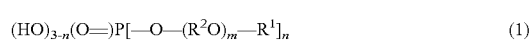

$$(HO)_{3-n}(O=)P[—O—(R^2O)_m—R^1]_n \qquad (1)$$

wherein $R^1$ is an alkyl group, $R^2$ is an alkylene group, m is an integer of 1 to 20, and n is an integer of 1 to 3.

2. The method for preparing the article according to claim 1, wherein the release treatment solution is a 0.01 to 2.0% by weight aqueous solution of the mold release agent.

3. The method for preparing the article according to claim 1, wherein the internal release agent of the active energy ray curable resin composition is a (poly)oxyalkylene alkyl phosphoric ester compound.

4. The method for preparing the article according to claim 1, wherein the pH of an aqueous solution resulting from extraction of 1 g of the internal release agent with 50 mL of water is 3.0 or more.

5. The method for preparing the article according to claim 1, wherein the mold release agent and the internal release agent are the same as each other.

6. The method for preparing the article according to claim 1, wherein the difference in SP values between the mold release agent and the internal release agent is 2.0 or less.

* * * * *